United States Patent
Panguluri et al.

(10) Patent No.: US 9,619,198 B2
(45) Date of Patent: Apr. 11, 2017

(54) DYNAMIC PLAYOUT OF AUDIBLE PUNCTUATION IN CONNECTION WITH PLAYOUT OF PLAYLIST CONTENT

(71) Applicant: Tribune Digital Ventures, LLC

(72) Inventors: Venkatarama Anilkumar Panguluri, Milpitas, CA (US); John Zhenghao Yeh, Foster City, CA (US)

(73) Assignee: Tribune Digital Ventures, LLC, Chicago, IL (US)

( * ) Notice: Subject to any disclaimer, the term of this patent is extended or adjusted under 35 U.S.C. 154(b) by 326 days.

(21) Appl. No.: 14/196,789

(22) Filed: Mar. 4, 2014

(65) Prior Publication Data

US 2015/0254049 A1 Sep. 10, 2015

(51) Int. Cl.
*G06F 17/00* (2006.01)
*G06F 3/16* (2006.01)
*G06F 17/30* (2006.01)

(52) U.S. Cl.
CPC .......... *G06F 3/16* (2013.01); *G06F 17/30749* (2013.01); *G06F 17/30772* (2013.01)

(58) Field of Classification Search
CPC . G06F 3/16; G06F 17/30749; G06F 17/30772
USPC .......................................................... 700/94
See application file for complete search history.

(56) References Cited

U.S. PATENT DOCUMENTS

| | | |
|---|---|---|
| 2007/0021145 A1 | 1/2007 | Lam |
| 2007/0106672 A1 | 5/2007 | Sighart et al. |
| 2009/0307199 A1* | 12/2009 | Goodwin .......... G06F 17/30053 |
| 2010/0312369 A1* | 12/2010 | Dollar, Jr. ......... G06F 17/30749 700/94 |
| 2011/0154173 A1 | 6/2011 | Herlein |
| 2012/0042337 A1* | 2/2012 | De Bonet .............. G06Q 30/02 725/34 |
| 2012/0308210 A1 | 12/2012 | Ubillos |

OTHER PUBLICATIONS

Melissa Harris, "Pandora-like news radio app about to launch," Chicago Tribune website (http://articles.chicagotribune.com/2013-12-01/business/ct-biz-1201-confidential-levy-20131201_1_traffic-report-traffic-information-app), Dec. 1, 2013.
Printout of website relating to "Stitcher Radio for Podcasts" app, printed Mar. 4, 2014, 4 pages.
Printout of website relating to "Rivet News Radio" app, printed Mar. 4, 2014, 2 pages.

(Continued)

*Primary Examiner* — Joseph Saunders, Jr.
(74) *Attorney, Agent, or Firm* — McDonnell Boehnen Hulbert & Berghoff LLP (57) ABSTRACT

Disclosed are methods and systems for dynamically playing audible punctuation in connection with playout of content defined by a playlist. A client receives a playlist defining a sequence of media content items to be played out by the client, the playlist indicating attribute data for each media content item of the sequence. For each of at least one of the media content items of the playlist, the client determines based on the attribute data and perhaps based on user preference data an audible punctuation to play out in connection with playout of that media content item, and the client retrieves and plays out the audible punctuation in connection with playout of that media content item.

20 Claims, 7 Drawing Sheets

(56) References Cited

OTHER PUBLICATIONS

Printout of website relating to "Swell Radio for News and Podcasts" app, printed Mar. 4, 2014, 3 pages.
Printout of website relating to "Swell FAQs", printed Mar. 4, 2014, 6 pages.
International Search Report and Written Opinion from International Application No. PCT/US2014/071206, dated Mar. 26, 2015.
Korean Patent Application 1020060053444, published May 6, 2013 (English language abstract from KIPO website printed Apr. 10, 2015, and machine language translation from KIPO website printed Apr. 10, 2015).

\* cited by examiner

702 Receive via a communication interface a playlist defining a sequence of media content items to be played out via a user interface, the playlist indicating attribute data for each media content item of the sequence

704 For each of at least one of the media content items of the playlist, determine based on the attribute data that the playlist indicates for the media content a respective audible punctuation that the playlist does not indicate for the media content item, retrieve the determined audible punctuation, and play out the retrieved audible punctuation via the user interface in connection with playout of the media content item via the user interface

Figure 7

DYNAMIC PLAYOUT OF AUDIBLE PUNCTUATION IN CONNECTION WITH PLAYOUT OF PLAYLIST CONTENT

USAGE AND TERMINOLOGY

Throughout this disclosure, unless otherwise specified and/or unless the particular context clearly dictates otherwise, each usage of "a" or "an" means at least one, and each usage of "the" means the at least one.

TECHNICAL FIELD

This disclosure relates generally to computing devices, and more particularly, to computing devices configured for playing out media content such as personalized news programs for instance.

BACKGROUND

Unless otherwise indicated herein, the materials described in this section are not prior art to the claims in this disclosure and are not admitted to be prior art by inclusion in this section.

To listen to the radio, a listener typically tunes a receiver to a particular frequency (e.g., an AM or FM frequency) and listens to music, news, or other audible content being broadcast on that frequency by a radio station. The listener may tune the receiver, and therefore select a radio station, in a variety of ways, such as by rotating a dial, pushing a seek button, or pushing a station preset button. By selecting one of multiple radio stations, the listener may exert some control over the audible content presented to the listener. However, although the listener may control which station is selected, the listener is unlikely to have any influence over the audible content that gets broadcast by the selected station.

Typically, a radio station broadcasts the same audible content to multiple receivers, and therefore to multiple listeners, at the same time. Given this, it is common for a radio station to produce and broadcast audible content that is intended to appeal to a variety of different listeners. However, while some listeners may find such audible content appealing, other listeners may find it unappealing because it is not tailored to their particular interests.

SUMMARY

In one aspect, disclosed is a method that provides for dynamically injecting audible punctuation into playout of media content such as before or during playout of media content items specified by a playlist for instance. As disclosed, the method may involve receiving into a client device a playlist defining a sequence of media content items for playout by the client device, the playlist including attribute data respectively for each media content item of the sequence. Further, the method may involve requesting and receiving by the client device from one or more network servers the media content items of the received playlist, and playing out by the client device the received media content items in accordance with the sequence defined by the playlist.

Still further, the method may involve determining by the client device, based at least on the attribute data indicated by the received playlist for a given one of the media content items, an audible punctuation to play out in connection with playout of the given media content item, the audible punctuation not being indicated by the received playlist for the given media content item. The method may then involve retrieving by the client device the determined audible punctuation, and playing out by the client device the retrieved audible punctuation in connection with playout by the client device of the given media content item.

In another aspect, disclosed is a non-transitory computer readable medium having stored thereon program instructions executable by a computing device to carry out various functions. In an example implementation, the functions may include maintaining correlation data that correlates each of various types of media content with respective audible punctuation to be played out in connection with playout of media content of the type, with the correlation data possibly being user-specific, such as being based on a history of user input into the computing device. Further, the functions may include receiving a playlist defining a sequence of media content items for playout by the client device, the playlist specifying for each media content item a respective type of media content of the media content item, and retrieving and playing out each media content item of the received playlist in accordance with the sequence.

Still further, the functions may include, for each of at least one of the media content items of the received playlist, (a) determining the type of media content of the media content item, (b) using the correlation data to determine an audible punctuation corresponding with the determined type, (c) retrieving the determined audible punctuation, and (d) playing out the retrieved audible punctuation in connection with playout of the media content item. In practice, playing out the retrieved audible punctuation in connection with playout of the media content item may involve playing out the retrieved audible punctuation as an audible introduction before playout of the media content item and/or playing out the retrieved audible punctuation as background audio during playout of the media content item.

And in yet another aspect, disclosed is a computing device having a communication interface, a user interface, a processor, data storage, and program instructions stored in the data storage and executable by the processor to carry out various functions. In an example implementation, the functions may include receiving via the communication interface a playlist defining a sequence of media content items to be played out by the computing device via the user interface, the playlist indicating attribute data for each media content item of the sequence. Further, the functions may include, for each of at least one of the media content items of the playlist, determining based on the attribute data that the playlist indicates for the media content a respective audible punctuation, the playlist not indicating the respective audible punctuation for the media content item. And the functions may include retrieving the determined audible punctuation, and playing out via the user interface the retrieved audible punctuation in connection with playout of the media content item via the user interface.

These, as well as other aspects, advantages, and alternatives, will become apparent to those of ordinary skill in the art by reading the following detailed description, with reference where appropriate to the accompanying drawings.

DETAILED DESCRIPTION

I. Overview

As indicated above, a radio station may produce and broadcast audible content that is intended to appeal to a variety of different listeners. For example, in the context of producing and broadcasting a news program, a narrator (such as a news anchor affiliated with the radio station, or another person) may read aloud news stories from each of a variety of different predetermined categories, such as sports, politics, and entertainment, and the readings may be included as part of the news program.

Although some listeners may be interested in news stories from all of the predetermined categories, other listeners may have different interests. For example, one listener may be interested in sports and entertainment, but not politics, while another listener may be interested in politics and entertainment, but not sports. In either case, the listener may be presented with audible content that does not align with the listener's interests. As a result, the listener may find the news program unappealing.

One way to help address this issue is by implementing a system that provides a user with a personalized news program. In one aspect, such a system may include at least two computing devices, such as a server and a client, and a communication network through which the server and the client may communicate.

In this system, the server and the client may perform a variety of functions. For example, the server may determine one or more attributes associated with a user of the client and may use the determined attribute(s) as a basis to generate a playlist of a personalized news program for the user. The generated playlist may define a sequence of media content items each including a portion of audible content such as a news story, and may specify media content attribute data respectively for each media content item, including for instance a reference to the media content item and metadata characterizing the media content item. Collectively, this sequence of media content items may thus define a personalized news program for playout to the user.

After or as the server generates this playlist, the server may transmit the playlist to the client, and the client may traverse the entries of the playlist and retrieve and play out the indicated media content items in accordance with the sequence defined by the playlist. In practice, for instance, for each media content item of the sequence, (i) the client may transmit to the server, or to another server for that matter, a request for the media content item, (ii) the client may receive in response the requested media content item, and (iii) the client may play out the received media content item for the user.

Optimally, this process may involve streaming of the media content items to the client and playout of the sequence of media content items in real time by the client. In particular, for each media content item referenced by the playlist, the client may request a server to stream the media content item to the client, and the client may then receive in response a data stream defining the requested media content item. As the client receives and buffers the requested media content items in sequence, the client may then play out the media content items to a user, thus providing the user with a substantially continuous playout of the media content items defining the personalized news program.

In accordance with the present disclosure, another way to help render a news program, or for that matter any sequence of media content items, more appealing to a user is for the client to dynamically enhance the program by strategically adding special "audible punctuation," such as sound effects or music, to the program.

Such audible punctuation may be audible content that helps to introduce playout of a media content item of the program or to separate playout of media content items of the program. Thus, the client may dynamically insert playout of special audible punctuation before playout of a given media content item of the sequence. Alternatively or additionally, the audible punctuation may be audible content that helps to entertain or soothe the user, or otherwise to enhance the user experience, by being played in the background while the client plays one or more media content items of the program. Thus, the client may dynamically play out the audible punctuation as background audio concurrently with the client's playout of the underlying media content of the sequence.

In practice, the client may maintain configuration data that correlates instances of audible punctuation with types of media content items. As the client traverses a playlist of media content items as described above, the client may then use that configuration data as a basis to map a given media content item of the sequence with an appropriate audible punctuation. For instance, the client may read the playlist to determine attribute data that the playlist indicates for the media content item, such as a type of media content for example, and the client may then determine from the configuration data an audible punctuation that corresponds with that attribute data. The client may then retrieve the determined audible punctuation and play out the audible punctuation in connection with playout of the media content item, such as before or during playout of the media content item.

Further, the configuration data that specifies these correlations with audible punctuations can be user-specific, established based on user input into the client. For example, the client may provide a configuration interface through which a user of the client can designate mappings between certain types of media content items and certain audible punctuations or classes of audible punctuations, and the client may store those mappings for use to map a given media content item of the sequence with an appropriate audible punctuation. And as another example, the client may dynamically establish such mappings based on an evaluation of one or more types of media the user prefers, such as by determining attributes of media the user selects for playout on the client or the like.

II. Example System

Figure 1:
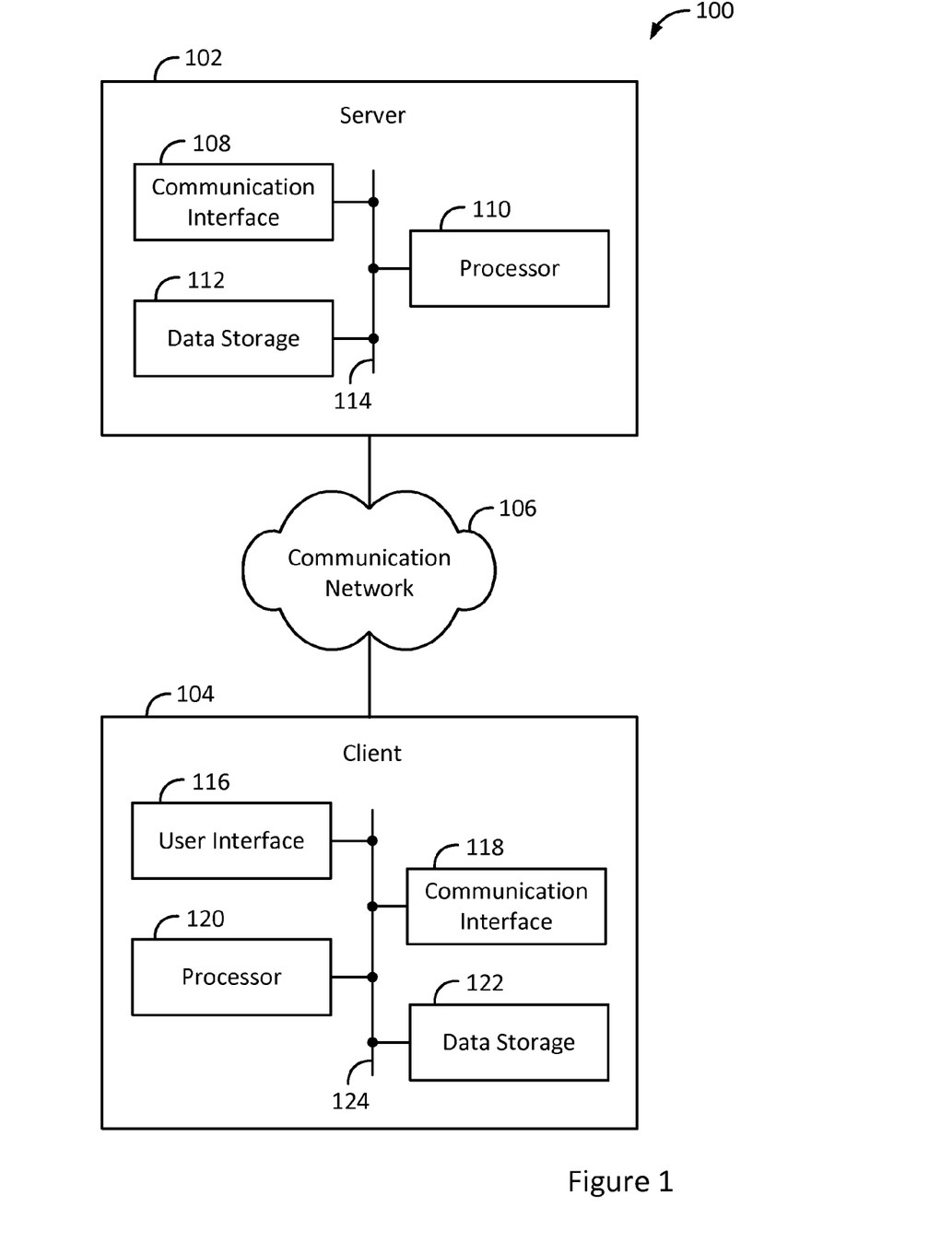
FIG. 1 is a simplified block diagram of an example system.

FIG. 1 is a simplified block diagram of an example system 100 in which aspects of the present disclosure can be implemented. As shown, the system 100 includes at least two computing devices, namely a server 102 and a client 104, and a communication network 106. Generally, the server 102 and the client 104 are configured for communicating with each other via the communication network 106.

A. Server

The server 102 may be configured for performing a variety of functions, such as those described throughout this disclosure (including the accompanying drawings). For example, the server 102 may be configured for establishing and sending to the client 14 a playlist defining a sequence of media content items that may define a personalized new program for instance, and for streaming various media content items to the client 104 via the communication network 106 for playout by the client 104.

The server 102 may take a variety of forms and may include various components, including for example, a communication interface 108, a processor 110, and a data storage 112, all of which may be communicatively linked with each other via a system bus, network, or other connection mechanism 114.

The communication interface 108 may take a variety of forms and may be configured to allow the server 102 to communicate with one or more devices according to any number of protocols. For instance, the communication interface 108 may be configured to allow the server 102 to communicate with the client 104 via the communication network 106. In one example, the communication interface 108 may take the form of a wired interface, such as an Ethernet interface. As another example, the communication interface 108 may take the form of a wireless interface, such as a cellular or WI-FI interface.

The processor 110 may include one or more general purpose processors (e.g., microprocessor) and/or one or more special purpose processors (e.g., digital signal processors (DSP)).

The data storage 112 may include one or more volatile, non-volatile, removable, and/or non-removable storage components, such as magnetic, optical, or flash storage, and may be integrated in whole or in part with the processor 110. Further, the data storage 112 may take the form of a non-transitory computer-readable storage medium, having stored thereon program instructions (e.g., compiled or non-compiled program logic and/or machine code) that, when executed by the processor 110, cause the server 102 to perform one or more functions, such as those described in this disclosure.

B. Client

Likewise, the client 104 may be configured for performing a variety of functions such as those described in this disclosure. For example, the client 104 may be configured for receiving from the server 102 a playlist defining a sequence of media content items to be played out by the client, and to retrieve and play out each item of the playlist in accordance with the sequence. Further, the client 104 may be configured for evaluating the playlist to determine audible punctuation to play out in connection with playout of one or more media content items of the playlist, and to retrieve and play out such audible punctuation accordingly.

The client 104 may take a variety of forms, including for example, a mobile phone, tablet, laptop, media player, gaming device, wearable device, or vehicle. And the client 104 may include various components, including for example, a user interface 116, a communication interface 118, a processor 120, and a data storage 122, all of which may be communicatively linked with each other via a system bus, network, or other connection mechanism 124.

The user interface 116 may be configured for facilitating interaction between the client 104 and a user of the client 104, such as by receiving input from the user and providing output to the user. Thus, the user interface 116 may include input components such as a computer mouse, a keyboard, or a touch-sensitive panel. In addition, the user interface 116 may include output components such as a display screen (which, for example, may be combined with a touch-sensitive panel) and a sound speaker or other audio output mechanism. Furthermore, the user interface 116 may include a digital-analog conversion unit to facilitate playout of media content to a user.

The communication interface 118 may take a variety of forms and may be configured to allow the client 104 to communicate with one or more devices according to any number of protocols. For instance, the communication interface 118 may be configured to allow the client 104 to communicate with the server 102 via the communication network 106. Further, the communication interface 118 may take the form of a wired or wireless interface.

The processor 120 may include one or more general purpose processors and/or one or more special purpose processors, and the data storage 122 may include one or more volatile, non-volatile, removable, and/or non-removable storage components, and may be integrated in whole or in part with the processor 120. Further, the data storage 122 may take the form of a non-transitory computer-readable storage medium, having stored thereon program instructions that, when executed by the processor 120, cause the client 104 to perform one or more functions, such as those described in this disclosure. Such program instructions may define or be part of a discrete software application, such a native app or web app, that can be executed upon user request for instance.

C. Communication Network

Generally, the communication network 106 may be configured to allow the server 102 and the client 104 to communicate with each other using any number of protocols. In addition, the communication network 106 may take a variety of forms, including for example a packet-switched network such as the Internet.

III. Example Operation

Methods of this disclosure will now be described principally in connection with delivery of a personalized news program to a user of the client 104. It will be understood, however, that the disclosure can extend to apply with respect to delivery of other types of media programs as well, not necessarily limited to personalized news programs.

Figure 2:
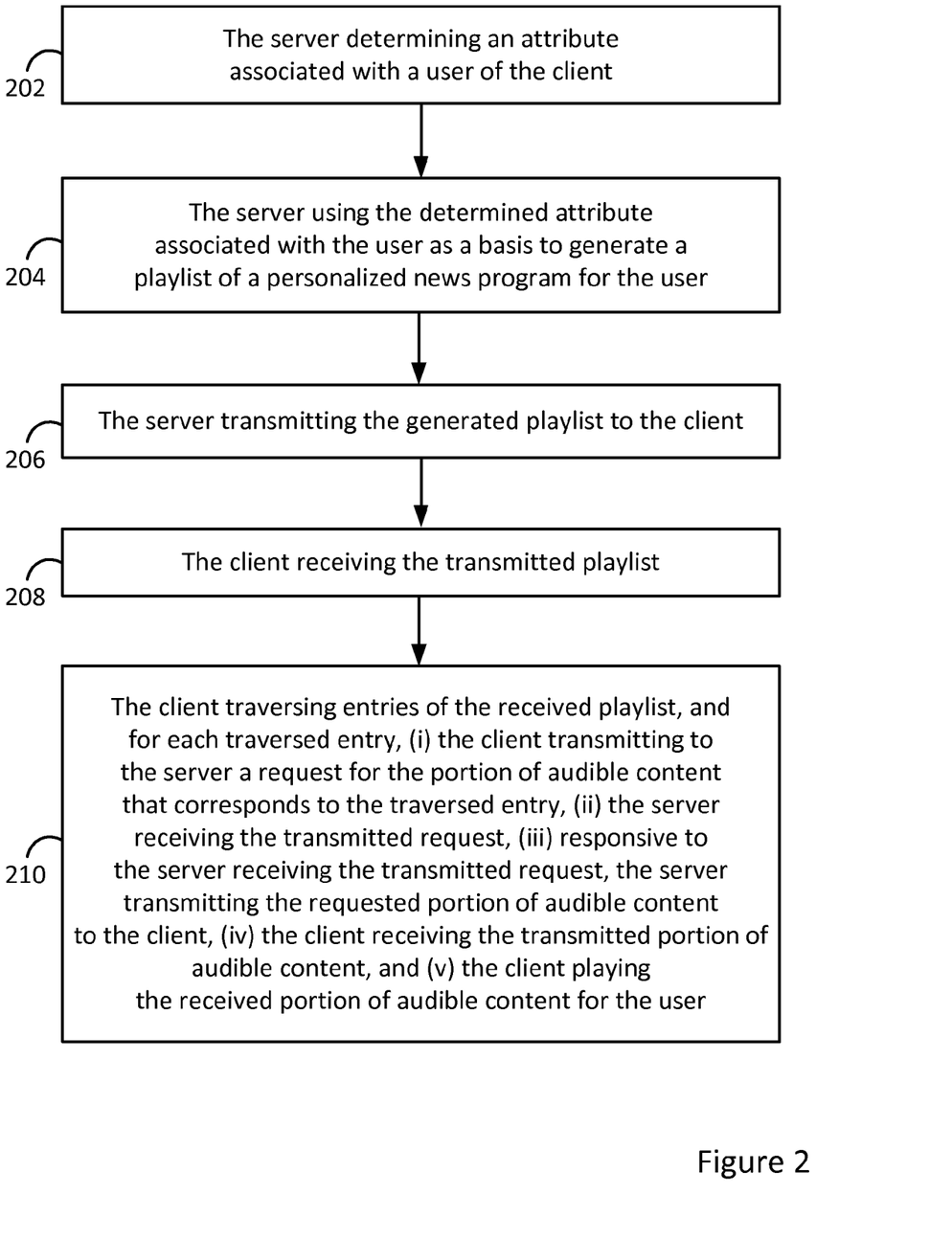
FIG. 2 is a flow chart depicting functions of an example method.

FIG. 2 is a flow chart depicting functions that can be carried out in an example method for providing a user of the client 104 with a personalized news program. At block 202, the example method involves the server 102 determining a set of one or more attributes associated with a user of the client 104. At block 204, the method then involves the server 102 using the determined set of attributes as a basis to generate a playlist of a personalized news program for the user. At block 206, the method then involves the server 102 transmitting the playlist to the client 104, and at block 208, the method involves the client 104 receiving the transmitted playlist. At block 210, the method then involves the client 104 traversing the received playlist, and for each item in the playlist, obtaining and playing out the indicated media content item.

In this process, the set of one or more user-associated attributes that the server 102 determines may take various forms. By way of example, the attributes may relate to one or more of the following: the user's extent of interest in a news category, the user's subscription to a news-related product or service (e.g., a newspaper subscription), the user's age, the user's gender, the user's current location, the user's destined location (e.g., a location to which the user is driving), the weather at the user's current location, the weather at the user's destined location, and the user's estimated travel time between the user's current location and the user's destined location.

Further, the function of the server 102 determining the set of one or more attributes associated with the user may take various forms. In one example implementation, for instance, the server 102 may receive from the client 104 an identification of the user of the client 104, and the server 102 may then refer to one or more data sources that correlate or facilitate correlation of that identification with one or more user attributes, so as to determine one or more attributes of the user. And in another example implementation, the client 104 itself may determine one or more attributes of the user and may report the determined attribute(s) to the server 102, in which case the server would determine the one or more attributes of the user by receiving the report of attribute(s) from the client 104. To facilitate this, the client 104 may provide a configuration interface through which the user can manually enter or select one or more attributes of the user, and the client 104 may thus determine the user attribute(s) by receiving user indications of the attribute(s) through that interface. Alternatively or additionally, the client 104 may determine the user attribute(s) by evaluating information associated with the user, such as user profile records, browsing history, shopping history, location history and the like. Other examples are possible as well.

For this purpose, the client 104 may determine an attribute associated with a user in a variety of ways. As one example, the client 104 may receive the attribute as input from the user. As another example, the client 104 may receive other input from the user, and the client 104 may use the input as a basis to determine the attribute. For instance, the client 104 may receive as input from the user, the user's destined location, and the client 104 may use a positioning device and a navigation software application to determine the user's estimated travel time from the user's current location to the user's destined location. In some instances, the client may communicate with the server 102 or another server, such as a server affiliated with the mapping application, to determine such an attribute. Other example techniques for determining an attribute associated with a user are possible as well.

The server 102 may then use the determined one or more attributes of the user in various ways to generate the playlist of a personalized news program for the user. For instance, based on the user attribute(s), the server 102 may select particular news stories or types of news stories to specify as media content items in the playlist. As such, the server 102 may be configured with data that maps particular sets of user attributes with particular types of news stories, possibly giving more weight to inclusion of certain types of news stories than to other types of news stories. For example, the data may indicate that a particular set of user attributes suggests more likely user interest in entertainment news than in politics news, in which case the server 102 may structure the playlist to specify a greater extent of entertainment news stories than politics news stories. As another example, the data may indicate that a particular set of user attributes suggests great user interest in sports, in which case the server 102 may structure the playlist to specify a relatively great extent of sports-related news stories.

In line with the discussion above, the playlist that the server 102 generates may define an ordered sequence of entries, each of which provides data regarding a respective media content item, such as a particular news story or class of news story. For each entry, the playlist may include respective attribute data for the media content item. In practice for instance, the playlist may provide this information in various ways, such as with use of extensible markup language (XML) for instance, in a manner that the client 104 would be configured to read.

The attribute data that the playlist indicates for each media content item may include a reference to the media content item, such as a network address or content identifier that the client 104 can read and use as a basis to request and receive the media content item for playout. Thus, the client 104 may read the reference indicated for a given media content item to determine a network address or the like from which to obtain the media content item, and the client 104 may request and receive the media content item from that network address or by otherwise using the indicated reference.

Such a reference may have various levels of granularity. By way of example, the reference may be specific to a particular news story, by specifying a particular story identifier or name of a news story media file for instance, in which case the client 104 could request the server 102 to transmit that particular news story and the server 102 could retrieve that particular news story from data storage and transmit it to the client 104. And as another example, the reference may be more general, specifying a class of news story, such as "traffic" or "weather" for instance, in which case the client 104 could request the server 102 to transmit a news story of that class generally, and the server 102 may then retrieve a latest or most pertinent news story of that class and transmit it to the client 104. Further, any or all of these references may refer to locations other than server 102, such as to one or more other servers for instance.

In addition, together or separate from the reference, the attribute data for each given media content item of the playlist may include an indication of a type of content of the media content item. With respect to news stories for instance, this type could take various forms, examples of which include sports, entertainment, politics, finance, traffic, weather, or the like, which may be indicated by text or coded tags that the client 104 is configured to read and use for purposes described herein for instance.

Further, the server 102 may transmit the generated playlist to the client 104, and the client 104 may receive the generated playlist, in various ways. By way of example, the client 104 may transmit to the server 102 a hypertext transfer protocol (HTTP) request or the like seeking the playlist, and the server 102 may respond by generating the playlist and transmitting the playlist to the client 104 in an HTTP response or the like.

Continuing with reference to FIG. 2, as noted above, at block 210, the method involves the client 104 traversing the received playlist, and for each item in the playlist, obtaining and playing out the indicated media content item. As further noted above, this process may involve streaming of the media content item from the server 102, or from one or more other servers, to the client 104. In practice, for instance, as the client 104 traverses the playlist, the client 104 may read each successive entry to determine the reference that the entry specifies for a media content item, and the client may transmit to the server 102 a request for the server 102 to stream that media content item to the client 104. To facilitate this, the client 104 may engage in signaling with the server 102 in accordance with the Real Time Streaming Protocol (RTSP), to establish a streaming media session and to specify the content to be streamed, and the server 102 may stream the requested content to the client 104 in accordance with the Real-time Transport Protocol (RTP). As the client 104 receives this streamed content, the client 104 may then buffer and play out the content in real time, providing the user with substantially continuous playout of the news program.

Figure 3:
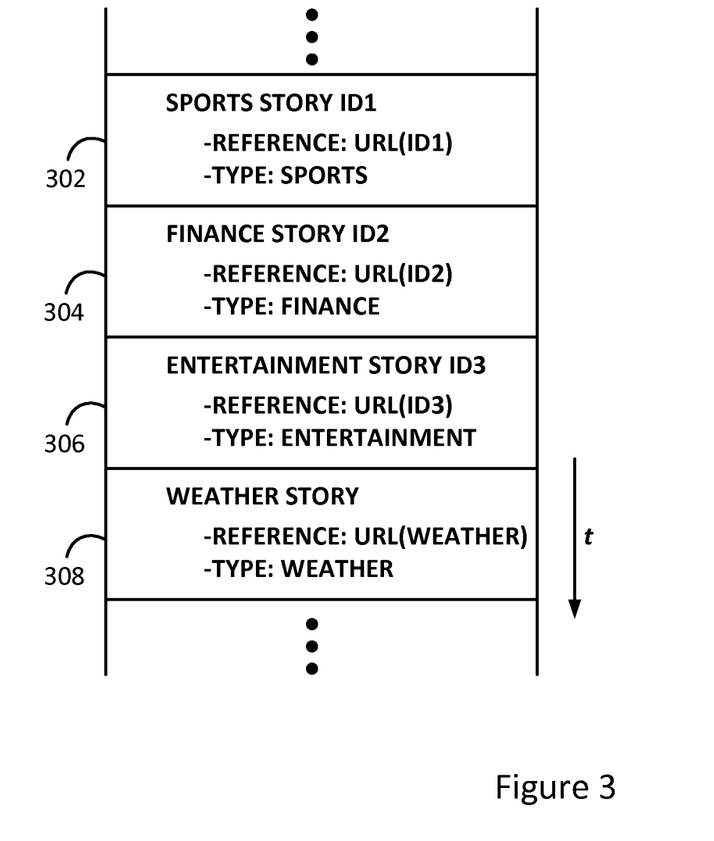
FIG. 3 is a diagram of an example playlist.

To help appreciate operation of this process, FIG. 3 depicts a portion of a simplified playlist that the server 102 may send to the client 104, defining a personalized news program. As shown, the playlist portion includes four example entries 302, 304, 306, and 308, each of which is for a respective news story and designates a respective reference and story type. In particular, entry 302 designates a sports story having identifier ID1, with a reference in the form of a uniform resource locator (URL) that may point to the server 102 and that designates ID1 as a query parameter or the like, and with a content type indication of SPORTS. Entry 304 then designates a finance story having identifier ID2, with a reference in the form of a URL designating ID2 as a query parameter, and with a content type indication of FINANCE. Entry 306 in turn designates an entertainment story having identifier ID3, with a reference in the form of a URL designating ID3 as a query parameter, and with a content type indication of ENTERTAINMENT. And entry 308 designates a weather story generally identified by the class WEATHER, with a reference in the form of a URL designating WEATHER as a query parameter, and with a content type indication of WEATHER.

Upon receipt of a playlist including these entries from the server 102, the client 104 may traverse the entries and, one by one, request streaming of the referenced content from the server 102, and may receive and play out the requested content in the sequence indicated.

As noted above, another way to help enhance user experience when playing out media content in accordance with a playlist is to dynamically inject playout of audible punctuation at certain strategic points in the playout. In line with the discussion above, for instance, the client 104 may select appropriate audible punctuation to play out in connection with particular media content items based on a consideration of the content types of the media content items and based further on consideration of user preference information such as information suggesting user preference for particular types of audible content.

In practice, each such audible punctuation may exist in the form of an audio file stored locally in data storage at the client 104 or accessible from server 102 or the like and may, like the media content items discussed above, have a respective identifier. Thus, the client 104 may retrieve and play out a given audible punctuation either by retrieving it from local data storage and playing it out or by requesting and receiving it in response from server 102 or the like, possibly as a separate real-time media stream.

In a representative implementation, the playlist that indicates the media content items for the client to play out, and indicates attribute data regarding each media content item, will not specify or otherwise indicate the audible punctuations to play out in connection with the media content items. Rather, the client 104 may determine audible punctuations to play out and may inject playout of those audible punctuation items accordingly.

Further, as noted above, the client 104 can play out such audible punctuation in connection with a particular media content item of the playlist in various ways. For example, the client 104 could play out the audible punctuation as an audible introduction to the media content item by playing it out just before playing out the media content item, such as by injecting playout of the audible punctuation in between playout of a previous media content item and the media content item at issue. And as another example, the client 104 could play out the audible punctuation as background audio during playout of the media content item, by playing out the audible punctuation concurrently with playout of the media content item.

To facilitate determining which audible punctuation to play out in connection with a given media content item of the playlist, as noted above, the client 104 may maintain in its data storage configuration data that defines mappings between audible punctuations and content types of media content items. The client 104 could then refer to that configuration data to map the content type that the playlist indicates for a particular media content item to an audible punctuation to play out in connection with the media content item.

By way of example, this configuration data could be a table or other data structure that correlates each of various content types with a respective audible punctuation. For instance, the configuration data could specify that (i) for SPORTS stories, the associated audible punctuation is a particular audio file defining the sound of a referee's whistle blowing, (ii) for FINANCE stories, the associated audible punctuation is a particular audio file defining the sound of a marked bell ringing, and (iii) for TRAFFIC stories, the associated audible punctuation is a particular audio file defining the sound of car traffic. Further, the configuration data could specify different audible punctuations to play out for a particular content type depending on various factors such as time of day, location, weather conditions, or the like, which the client 104 could determine through various online interfaces. Other examples are of course possible as well.

In a more robust implementation, however, the mappings of the configuration data could be more user specific, established based at least in part on user input and/or user preference information of a user of the client 104, such as a user currently using the client 104.

Establishing such configuration data could involve the client 104 providing a user configuration interface, such as a graphical user interface, through which the user can designate certain audible punctuations to be played in connection with certain content types of media content items. Such an interface, for instance, may provide the user with a listing of audio files stored on the client 104 and/or accessible from the server 102 or the like, as well as a listing of various content types, and may allow the user to designate for each content type a desired audio file for the client 104 to play out as audible punctuation in connection with media content items of that type.

Further, the interface may allow the user to designate certain playout parameters for audible punctuations, depending on various factors. For instance, the interface may allow the user to designate for a given content type various different audible punctuations for the client 104 to selectively play out depending on factors such as time of day, location, and the like, so that the client may play out one audible punctuation in connection with a media content item of that content type if the current time of day is in a particular time of day range or if the location of the client 104 is in a particular location range, but may play out a different audible punctuation in connection with a media content item of that content type if the time of day is in another particular time of day range or the location of the client 104 is in another particular location range. Likewise, the interface may allow the user to designate volume levels or other characteristics of playout of various audible punctuations, possibly also depending on similar factors.

Alternatively or additionally, establishing user-specific configuration data could involve the client 104 evaluating data regarding the user to deduce what appropriate audible punctuations would be for the user. For instance, the client 104 may determine a user preference associated with the user by evaluating information such as shopping history of the user (e.g., per online shopping history records in a browser of the client 104), web browsing history of the user (e.g., per browsing history records in a browser of the client 104), location of the user (e.g., determined by use of a satellite based positioning system and/or through communication with a network location determination platform), media playout selection history of the user (e.g., as indicated by a media player application on the client 104), gender of the user (e.g., as indicated by a user profile record stored on the client 104), and/or age of the user (e.g., as indicated by a user profile record stored on the client 104).

The client 104 may be programmed or provisioned with data or logic that correlates various values of these or other pieces of information with particular genres or other classes of audio, and the client 104 may further be programmed or provisioned with data or logic that in turn specifies sets of audible punctuations per genre or class of audio, with each set of audible punctuations including audible punctuations that would correspond with each of various media content types. Thus, provided with information about the user such as any of the information noted above, the client 104 could determine a corresponding genre or class of music, and provided with that genre or class of music, the client 104 could determine audible punctuations to play respectively in connection with various media content items.

As a specific example of this, the client 104 could evaluate records stored in the client that indicate a history of media playout selection by the user, such as play counts respectively for each of various songs (with the theory perhaps being that the user either selected playout of each such song having a play count or implicitly selected playout of the song by not stopping the playout of the song). From that data, the client 104 may determine a genre or other type of songs played most often and could thereby deem the user to have a preference for that particular genre or other type. The client 104 may then set as audible punctuations to be played to the user one or more audio files of the same or similar genre or type.

Furthermore, this type of mapping logic may also allow the client to determine volume levels and other parameters regarding playout of audible punctuations for the user. For instance, the client 104 may determine that the user has tended to play a particular type of audible content at a certain volume level at particular times or day or at particular locations, and based on that information, the client 104 may set itself to play audible punctuations of that type at a similar volume level if the time and/or location is similar. And the client 104 may designate duration of audible punctuations and whether playout of the audible punctuations should be before a media content item or as background during the media content item, among other parameters.

In addition, the client may be pre-provisioned or user-configured with various audible-punctuation "themes" that each map various types of media content items with audible punctuations of a respective class, and the client may be arranged to receive through the configuration interface a user selection of one of those themes and to responsively set that user-selected theme as the active theme.

For example, the client may be pre-provisioned or configured with a "mellow" theme that maps each type of media content item respectively with a particular audio selection deemed to be mellow or calming, a "morning" theme that maps each type of media content item respectively with a particular morning-themed audio selection such as the sound of birds tweeting or roosters crowing, and a "rock" theme that maps each type of media content item respectively with a particular rock music selection. The configuration interface may then be arranged to present a list of available themes such as these and to receive user input defining a selection of a theme from the presented list, and the client may be arranged to responsively set the selected theme as the active theme so that the client will thereafter apply the mappings of the selected theme and therefore play out the audible punctuations of the theme in connection with playout of media content items.

Further, the user configuration interface may be arranged to receive user input defining a schedule and/or other criteria for automatically making particular themes active. For instance, the interface may be arranged to receive user input specifying particular times of day when particular themes should be active, and/or particular locations when particular themes should be active, and the client may be arranged to automatically apply the designated themes according to that user input.

Figure 4:
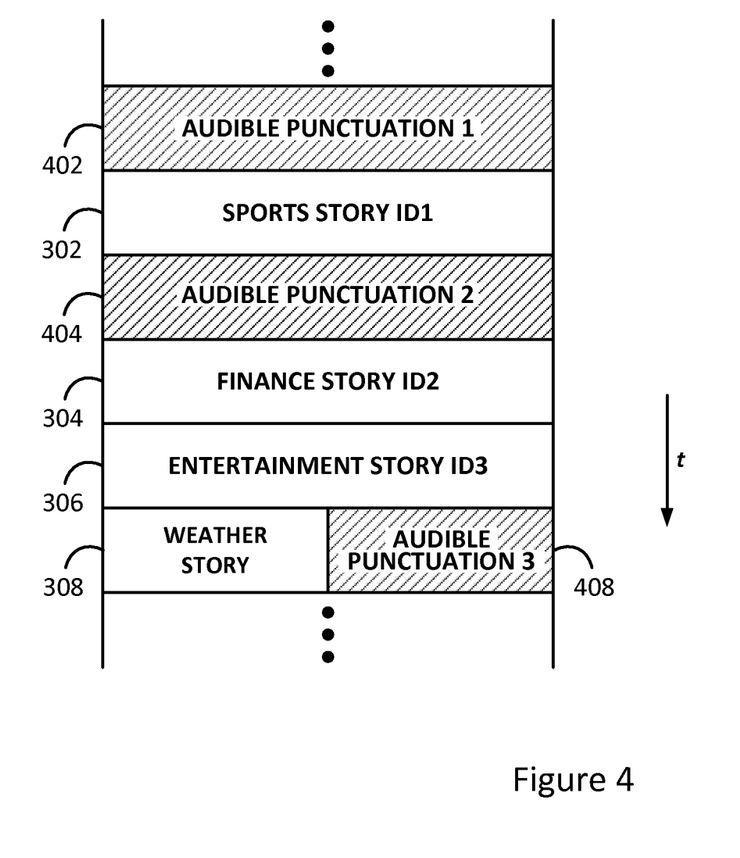
FIG. 4 is a diagram showing where audible punctuation may be injected with respect to entries of the example playlist of FIG. 3.

FIG. 4 next helps illustrate how the client 104 may inject playout of audible punctuation in connection with the client's playout of particular news stories of the playlist of FIG. 3. In particular, FIG. 4 illustrates an example in which the client 104 injects a first audible punctuation 402 as an introduction to the example SPORTS story of entry 302, a second audible punctuation 404 as an introduction to the example FINANCE story of entry 304, and a third audible punctuation 408 as background audio for the example WEATHER story of entry 308. This also illustrates that the client 104 may inject playout of different audible punctuations in connection with different media content items of the playlist, and that the client 104 may forgo injecting playout of an audible punctuation in connection with one or more of the media content items of the playlist (such as in connection with the ENTERTAINMENT story of entry 306).

To reach the result illustrated by FIG. 4, as the client 104 traverses the playlist, the client may read the content type of each successive news story, determine whether to play out an audible punctuation in connection with the news story, and if so, which one to play out, and if so may retrieve and play out the determined audible punctuation in connection with the news story.

Thus, in the example shown, the client 104 may determine that the content type of the news story of entry 302 is SPORTS and, based on the configuration data, may select as the first audible punctuation 402 an audio recording of a sports stadium crowd, and retrieve and play out that audio recording between the preceding (not shown) news story and the SPORTS story of entry 302. Further, the client may determine that the content type of the news story of entry 304 is FINANCE and, based on the configuration data, may select as the second audible punctuation 404 an audio recording of a trading floor bell sound and retrieve and play out that audio recording between the SPORTS story of entry 302 and the FINANCE story of entry 304. And the client may determine that the content type of the news story of entry 308 is WEATHER and, based on the configuration data, may select as the third audible punctuation 408 an audio recording of wind blowing and birds chirping and retrieve and play out that recording in the background during playout of the WEATHER news story of entry 308.

Figure 5:
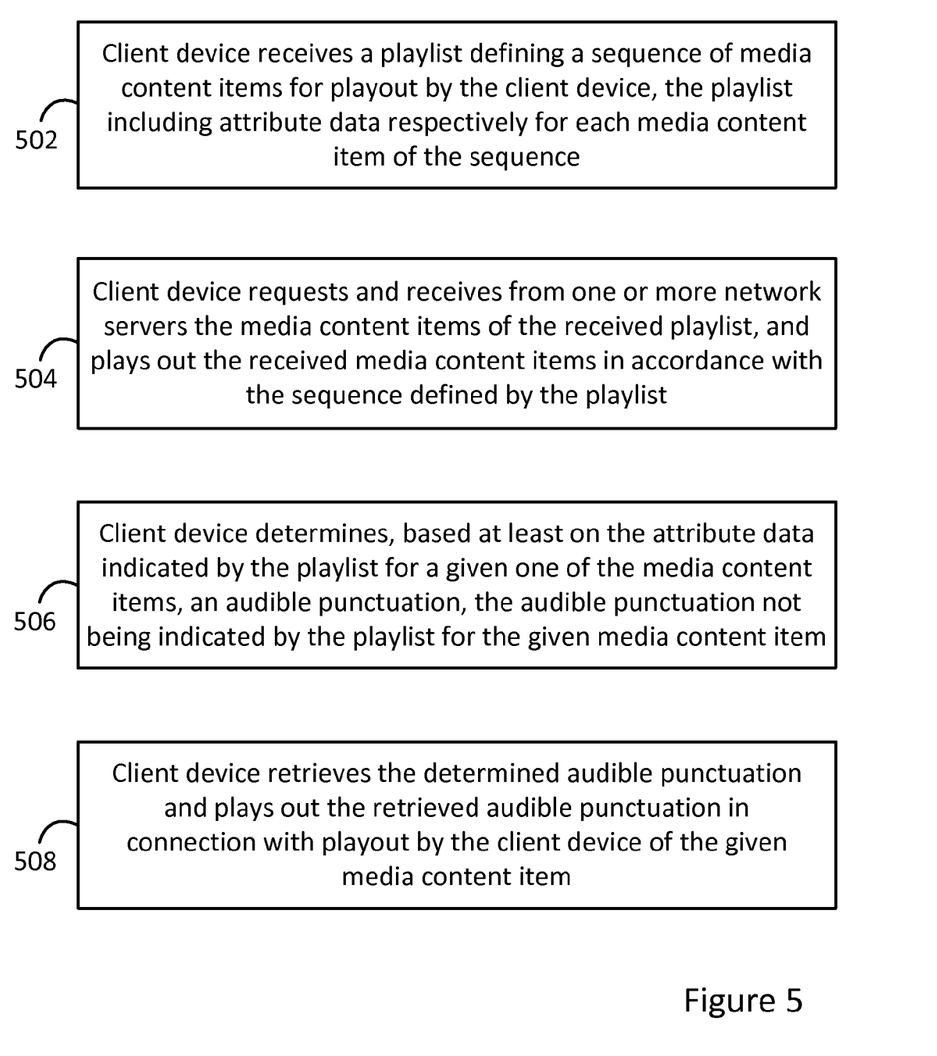
FIG. 5 is a depiction of functions that can be carried out in accordance with an example method.

FIG. 5 is next a depiction of functions that can be carried out in an example method that includes dynamic injection of audible punctuation in line with the discussion above, by a client device such as client 104 for instance. The blocks of FIG. 5 are shown without flow arrows between them, because the client may carry out these functions in various order, perhaps carrying out multiple functions concurrently.

As shown in FIG. 5, at block 502, the method involves the client device receiving a playlist defining a sequence of media content items for playout by the client device, the playlist including attribute data respectively for each media content item of the sequence. At block 504, the method further involves the client device requesting and receiving from one or more network servers the media content items of the received playlist, and the client device playing out the received media content items in accordance with the sequence defined by the playlist. At block 506, the method further involves the client device determining, based at least on the attribute data indicated by the playlist for a given one of the media content items, an audible punctuation, the audible punctuation not being indicated by the playlist for the given media content item. And at block 508, the method further involves the client device retrieving the determined audible punctuation and playing out the retrieved audible punctuation in connection with playout by the client device of the given media content item.

Figure 6:
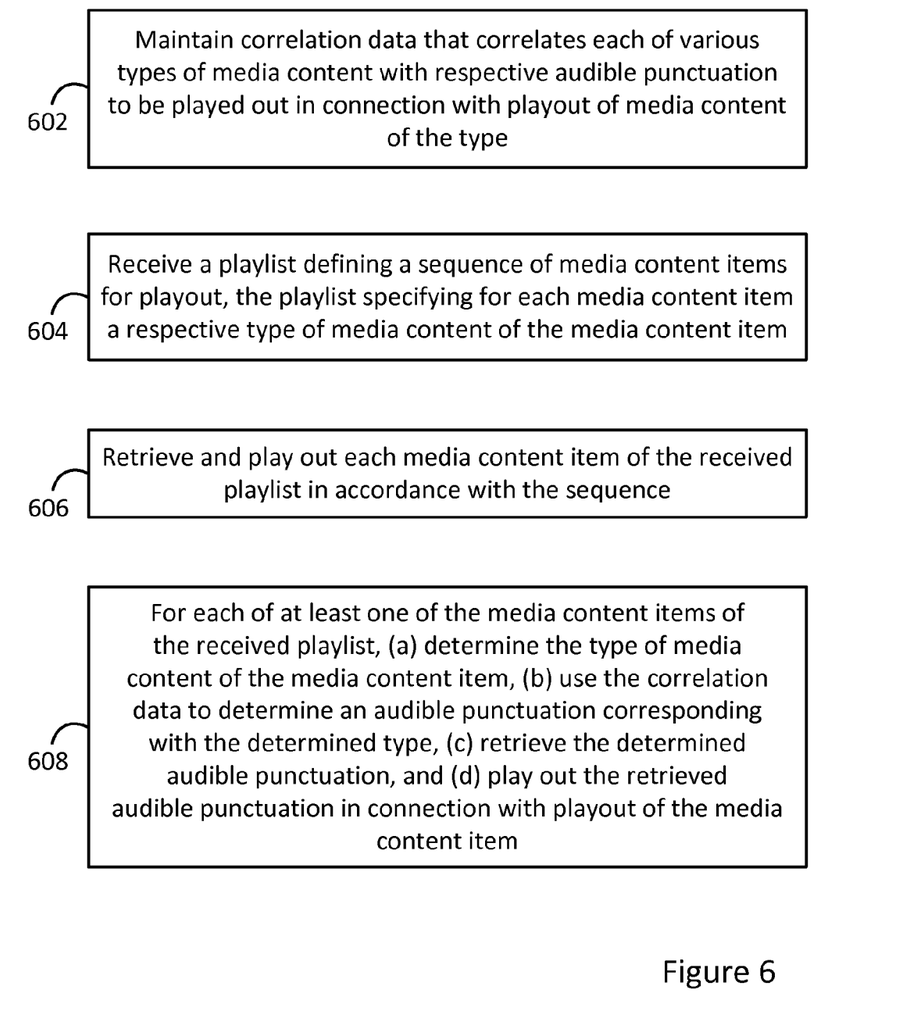
FIG. 6 is another depiction of functions that can be carried out in accordance with an example method.

FIG. 6 is next another depiction of functions that can be carried out in an example method that also includes dynamic injection of audible punctuation. In practice, these functions could be carried out by a computing device such as client 104 executing program instructions stored (e.g., encoded) on a non-transitory computer readable medium such as data storage of the type noted above for instance.

As shown in FIG. 6, at block 602, the functions include maintaining correlation data that correlates each of various types of media content with respective audible punctuation to be played out in connection with playout of media content of the type. Further, at block 604, the functions include receiving a playlist defining a sequence of media content items for playout by the computing device, the playlist specifying for each media content item a respective type of media content of the media content item. And at block 606, the functions include retrieving and playing out each media content item of the received playlist in accordance with the sequence.

Further, at block 608, the functions include, for each of at least one of the media content items of the received playlist, (a) determining the type of media content of the media content item, (b) using the correlation data to determine an audible punctuation corresponding with the determined type, (c) retrieving the determined audible punctuation, and (d) playing out the retrieved audible punctuation in connection with playout of the media content item, in the manner discussed above for instance.

Figure 7:
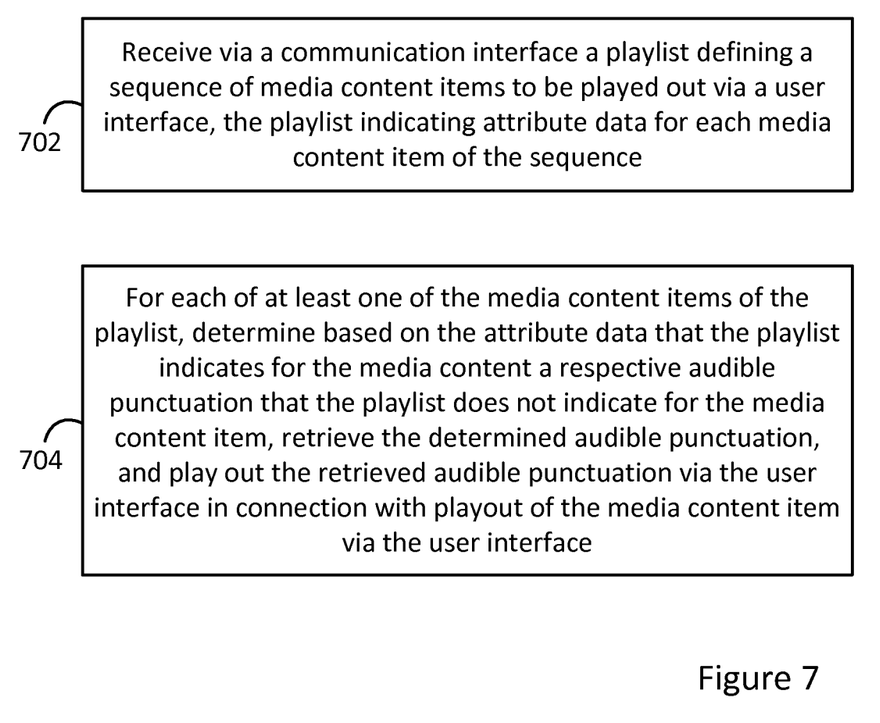
FIG. 7 is another depiction of functions that can be carried out in accordance with an example method.

Finally, FIG. 7 depicts yet another set of functions that can be carried out in an example method that also includes dynamic injection of audible punctuation. In practice, these functions could similarly be carried out by a processor of a computing device such as client 104 executing program instructions stored in data storage of the computing device.

As shown in FIG. 7, at block 702, the functions include receiving via a communication interface a playlist defining a sequence of media content items to be played out by the computing device via a user interface, the playlist indicating attribute data for each media content item of the sequence. Further, at block 704, the functions include, for each of at least one of the media content items of the playlist, determining based on the attribute data that the playlist indicates for the media content a respective audible punctuation that the playlist does not indicate for the media content item, retrieving the determined audible punctuation, and playing out the retrieved audible punctuation via the user interface in connection with playout of the media content item via the user interface.

IV. Example Variations

The variations described in connection with select examples of the disclosed system and method may be applied to all other examples of the disclosed system and method.

Further, while one or more functions have been described as being performed by or otherwise related to certain devices or entities (e.g., the server 102 or the client 104), the functions may be performed by or otherwise related to any device or entity. As such, any function that has been described as being performed by the server 102 could alternatively be performed by a different network server or by the client 104. For instance, as noted above, one server could generate and transmit a playlist to a client, and based on the playlist data of the playlist, the client could request and receive different portions of audible content from multiple other servers.

Further, the functions need not be performed in the disclosed order, although in some examples, an order may be preferred. Also, not all functions need to be performed to achieve the desired advantages of the disclosed system and method, and therefore not all functions are necessarily required.

While select examples have been described, alterations and permutations of these examples will be apparent to those of ordinary skill in the art. Other changes, substitutions, and alterations are also possible without departing from the disclosed system and method in its broader aspects as set forth in the following claims.

We claim:
1. A method comprising:
    determining by a client device, based at least on history of user input defining audible content playout selections at the client device, a genre of audio that a user of the client device tends to prefer, and establishing by the client device, based on the determined genre, mapping data that correlates each of various types of media content with respective audible punctuation of the determined genre, wherein the types comprise news stories selected from the group consisting of sports, politics, finance, entertainment, traffic, and weather;
    receiving into the client device a playlist defining a sequence of media content items for playout by the client device, wherein the playlist indicates respectively for each of a plurality of the media content items which of the types of media content the media content item is;
    requesting and receiving by the client device from one or more network servers the media content items of the received playlist, and playing out by the client device the received media content items in accordance with the sequence defined by the playlist; and
    for a given one of the plurality of the media content items, (i) determining by the client device the indicated type of the given media content item, (ii) determining by the client device, based on the determined type of the given media content item, the audible punctuation of the determined genre that the mapping data correlates with the determined type of the given media content item, wherein the determined audible punctuation is not indicated by the received playlist, and (iii) playing out by the client device the determined audible punctuation in connection with playout by the client device of the given media content item.

2. The method of claim 1, wherein receiving the playlist into the client device comprises receiving the playlist transmitted to the client device from a network server.

3. The method of claim 1, wherein the received playlist includes a reference respectively to each media content item of the sequence, and wherein requesting and receiving each media content item of the sequence comprises reading the reference to the media content item and using the reference to request and receive the media content item.

4. The method of claim 1, wherein determining by the client device the genre of audio that the user of the client device tends to prefer is further based on at least one factor selected from the group consisting of:
shopping history of the user,
web browsing history of the user,
location of the user,
gender of the user, and
age of the user.

5. The method of claim 1, wherein playing out by the client device the determined audible punctuation in connection with playout by the client device of the given media content item comprises at least one operation selected from the group consisting of (i) playing out by the client device the determined audible punctuation as an introduction to, and thus before, playout by the client device of the given media content item and (ii) playing out by the client device the determined audible punctuation as background audio during playout by the client device of the given media content item.

6. The method of claim 1, wherein playing out by the client device the determined audible punctuation in connection with playout by the client device of the media content item comprises:
retrieving by the client device the determined audible punctuation and playing out by the client device the retrieved audible punctuation in connection with playout by the client device of the given media content item.

7. The method of claim 6, wherein retrieving the determined audible punctuation comprises retrieving from data storage of the client device an audio file of the audible punctuation or receiving the audible punctuation from a network server.

8. The method of claim 1, wherein the determined genre of audio comprises audio of a particular volume level.

9. A non-transitory computer readable medium having stored thereon program instructions executable by a computing device to carry out functions comprising:
determining, based at least on history of user input defining audible content playout selections at the computing device, a genre of audio that a user of the computing device tends to prefer, and establishing, based on the determined genre, mapping data that correlates each of various types of media content with respective audible punctuation of the determined genre, wherein the types comprise news stories selected from the group consisting of sports, politics, finance, entertainment, traffic, and weather;
receiving a playlist defining a sequence of media content items for playout by the computing device, wherein the playlist indicates respectively for each of a plurality of the media content items which of the types of media content the media content item is;

requesting and receiving from one or more network servers the media content items of the received playlist, and causing the computing device to play out the received media content items in accordance with the sequence defined by the playlist; and for a given one of the plurality of the media content items, (i) determining the indicated type of the given media content item, (ii) determining, based on the determined type of the given media content item, the audible punctuation of the determined genre that the mapping data correlates with the determined type of the given media content item, wherein the determined audible punctuation is not indicated by the received playlist, and (iii) causing the computing device to play out the determined audible punctuation in connection with playout by the computing device of the given media content item.

10. The non-transitory computer readable medium of claim 9, wherein receiving the playlist comprises receiving the playlist transmitted to the computing device from a network server.

11. The non-transitory computer readable medium of claim 9, wherein the received playlist includes a reference respectively to each media content item of the sequence, and wherein requesting and receiving each media content item of the sequence comprises reading the reference to the media content item and using the reference to request and receive the media content item.

12. The non-transitory computer readable medium of claim 9, wherein determining the genre of audio that the user of the computing device tends to prefer is further based on at least one factor selected from the group consisting of:
shopping history of the user,
web browsing history of the user,
location of the user,
gender of the user, and
age of the user.

13. The non-transitory computer readable medium of claim 9, wherein playing out the determined audible punctuation in connection with playout by the computing device of the given media content item comprises at least one operation selected from the group consisting of (i) playing out the determined audible punctuation as an introduction to, and thus before, playout of the given media content item and (ii) playing out the determined audible punctuation as background audio during playout of the given media content item.

14. The non-transitory computer readable medium of claim 9, wherein causing the computing device to play out the determined audible punctuation in connection with playout of the media content item comprises:
retrieving the determined audible punctuation and causing the computing device to play out the retrieved audible punctuation in connection with playout of the given media content item.

15. The non-transitory computer readable medium of claim 14, wherein retrieving the determined audible punctuation comprises retrieving from data storage of the computing device an audio file of the audible punctuation or receiving the audible punctuation from a network server.

16. A computing device comprising:
a communication interface;
a user interface;
a processor;
data storage; and
program instructions stored in the data storage and executable by the processor to carry out operations comprising:
- determining, based at least on history of user input defining audible content playout selections at the computing device, a genre of music that a user of the computing device tends to prefer, and establishing, based on the determined genre, mapping data that correlates each of various types of media content with respective audible punctuation of the determined genre, wherein the types comprise news stories selected from the group consisting of sports, politics, finance, entertainment, traffic, and weather,
- receiving a playlist defining a sequence of media content items for playout by the computing device, wherein the playlist indicates respectively for each of a plurality of the media content items which of the types of media content the media content item is,
- requesting and receiving from one or more network servers the media content items of the received playlist, and causing the computing device to play out the received media content items in accordance with the sequence defined by the playlist, and
- for a given one of the plurality of the media content items, (i) determining the indicated type of the given media content item, (ii) determining, based on the determined type of the given media content item, the audible punctuation of the determined genre that the mapping data correlates with the determined type of the given media content item, wherein the determined audible punctuation is not indicated by the received playlist, and (iii) causing the computing device to play out the determined audible punctuation in connection with playout by the computing device of the given media content item.

17. The computing device of claim 16, wherein receiving the playlist comprises receiving the playlist transmitted to the computing device from a network server,
wherein the received playlist includes a reference respectively to each media content item of the sequence, and wherein requesting and receiving each media content item of the sequence comprises reading the reference to the media content item and using the reference to request and receive the media content item.

18. The computing device of claim 16, wherein determining the genre of music that the user of the computing device tends to prefer is further based on at least one factor selected from the group consisting of:
shopping history of the user,
web browsing history of the user,
location of the user,
gender of the user, and
age of the user.

19. The computing device of claim 16, wherein playing out the determined audible punctuation in connection with playout by the computing device of the given media content item comprises at least one operation selected from the group consisting of (i) playing out the determined audible punctuation as an introduction to, and thus before, playout of the given media content item and (ii) playing out the determined audible punctuation as background audio during playout of the given media content item.

20. The computing device of claim 16, wherein causing the computing device to play out the determined audible punctuation in connection with playout of the media content item comprises:
retrieving the determined audible punctuation and causing the computing device to play out the retrieved audible punctuation in connection with playout of the given media content item.

\* \* \* \* \*